United States Patent [19]

Smaardijk et al.

[11] Patent Number: 5,037,944
[45] Date of Patent: Aug. 6, 1991

[54] RESIN COMPOSITIONS

[75] Inventors: Abraham A. Smaardijk; Arris H. Kramer, both of Amsterdam, Netherlands

[73] Assignee: Shell Oil Company, Houston, Tex.

[21] Appl. No.: 433,871

[22] Filed: Nov. 9, 1989

[30] Foreign Application Priority Data

Nov. 10, 1988 [GB] United Kingdom ............. 8826324

[51] Int. Cl.$^5$ .................. C08G 12/06; C08G 67/02; C07C 49/17
[52] U.S. Cl. ................. 528/229; 528/382; 528/392; 568/412; 568/413
[58] Field of Search ............ 528/392; 525/382, 229; 568/412, 413

[56] References Cited

U.S. PATENT DOCUMENTS

| | | | |
|---|---|---|---|
| 3,694,412 | 9/1972 | Nozaki | 260/63 CQ |
| 3,979,374 | 9/1976 | Kiovsky et al. | 526/12 |
| 4,389,513 | 6/1983 | Miyazaki | 525/382 |
| 4,877,860 | 10/1989 | van Broekhoven et al. | 528/392 |

FOREIGN PATENT DOCUMENTS

| | | |
|---|---|---|
| 121965 | 10/1984 | European Pat. Off. |
| 181014 | 5/1986 | European Pat. Off. |
| 213671 | 3/1987 | European Pat. Off. |
| 257663 | 3/1988 | European Pat. Off. |

Primary Examiner—John Kight, III
Assistant Examiner—Kathryne E. Shelborne
Attorney, Agent, or Firm—James O. Okorafor

[57] ABSTRACT

Novel thermosetting resins are produced from low molecular weight linear alternating polymers of carbon monoxide and a suitable curing agent. The resin compositions are particularly useful as coatings.

13 Claims, No Drawings

RESIN COMPOSITIONS

FIELD OF THE INVENTION

This invention relates to novel thermosetting resin compositions. More particularly, the invention relates to such thermosetting resins produced by reaction of a curing agent and a low molecular weight, linear alternating polymer of carbon monoxide and at least one ethylenically unsaturated hydrocarbon.

BACKGROUND OF THE INVENTION

A wide variety of thermosetting resins is well known in the art and the resins and cured products therefrom are useful in a variety of applications, particularly coatings, where properties of strength, toughness and solvent resistance are desired. Particular applications are in the automotive and lacquer industries where good adhesion and temperature stability are particularly important along with solvent and stress resistance.

Also known in the art is the class of linear alternating polymers of carbon monoxide and olefin(s) known as polyketone polymers or polyketones. An early production of such polymers is disclosed by Nozaki, for example U.S. Pat. No. 3,694,412, in which polymerization is conducted in the presence of arylphosphine complexes of palladium moieties as catalyst and certain inert solvents. More recent processes for the production of such polymers are illustrated by a number of published European Patent Applications Nos. including 121,965, 181,014, 213,671 and 257,663. These processes typically employ a catalyst composition formed from a compound of palladium, cobalt or nickel, the anion of a strong non-hydrohalogenic acid and a bidentate ligand of phosphorus, arsenic or antimony. The scope of the polymerization process is extensive but, without wishing to be limited, preferred catalyst compositions are formed from a palladium compound such as palladium acetate, the anion of a non-hydrohalogenic acid having a pKa below 2, e.g., the anion of trifluoroacetic acid or p-toluenesulfonic acid, and a bidentate ligand of phosphorus such as 1,3-bis(diphenylphosphino)propane or 1,3-bis[di(2-methoxyphenyl)phosphino]propane. The linear alternating polymers are typically materials of relatively high molecular weight but by control of reaction conditions, particularly reaction time and temperature, low molecular weight polymers, also termed oligomers, are alternatively produced.

It is known that reaction with amino materials will serve to modify the chemical structure of the polyketone polymers. In U.S. Pat. No. 3,979,374 there is disclosed the reaction of a linear alternating polymer with primary amine compounds to produce thermoplastic polymers having pyrrole moieties within the polymer chain. In copending U.S. patent application Ser. No. 138,768, filed Dec. 29, 1987, there is disclosed a class of polypyridines produced from polyketone polymers which are also thermoplastic.

A somewhat different type of product is also disclosed in U.S. Pat. No. 3,979,374 when a relatively high molecular weight polyketone polymer was reacted with hexamethylenediamine. The insolubility of the resulting polymeric product in hexafluroisopropanol indicated that some degree of crosslinking was obtained when the polyketone polymer reacted with the difunctional amine. The crosslinked composition proved quite difficult to handle and the large amount of solvent needed to dissolve the polymer gave solutions of a composition too low to be useful from practical considerations. It would be of advantage to provide improved crosslinked resins which are thermosetting and which are produced by reaction of polyketone-type polymers and polyamino compounds.

SUMMARY OF THE INVENTION

The present invention provides improved thermosetting resin compositions derived from linear alternating polymers of carbon monoxide and at least one ethylenically unsaturated hydrocarbon. More particularly, the invention provides thermosetting resins produced by reaction of low molecular weight polymers of carbon monoxide and at least one ethylenically unsaturated hydrocarbon and a curing agent such as a polyamino compound. The resulting resins are particularly useful in forming coatings which exhibit good toughness and solvent resistance.

DESCRIPTION OF THE INVENTION

The linear alternating polymers of carbon monoxide and at least one ethylenically unsaturated hydrocarbon are low molecular weight polymers, also known as oligomers, having a molecular weight from about 500 to about 1800, preferably from about 1000 to about 1200. Ethylenically unsaturated hydrocarbons which are usefully employed as precursors of the linear alternating polymers have up to 10 carbon atoms inclusive, preferably up to 8 carbon atoms inclusive, and are illustrated by ethylene, propylene, 1-butene, isobutylene, 1-hexene, octene and decene. The straight-chain α-olefins are preferred as the polyketone polymer precursor and particularly preferred are ethylene and propylene. The low molecular weight polymers are produced from carbon monoxide and ethylenically unsaturated hydrocarbon according to the procedures of the above-identified published European Patent Applications.

The polymeric chain of the preferred low molecular weight polymers will have a linear alternating structure and be of the general formula

$$\underset{}{\pm}\text{C}-\text{R}'\underset{n}{\pm} \qquad \text{(I)}$$

wherein R' independently is alkylene of from 2 to 8 carbon atoms inclusive and n is an average number which reflects the molecular weight of the polymer. The end groups or "caps" of the polymer will depend on what materials were present during the production of the polymer and whether or how the polymer was purified. Although the end groups contribute little to the overall properties of the polymer so that the polymer is fairly represented by the above formula I for the polymeric chain, a more complete formula for a representative polymer produced in the reaction environment of the above published European Patent Applications is the formula

$$\text{R}\pm\text{C}-\text{R}'\underset{n}{\pm}\text{C}=\text{R} \qquad \text{(II)}$$

wherein R independently is alkyl of from 2 to 8 carbon atoms inclusive or alkoxy of up to 8 carbon atoms inclusive, and R' and n have the previously stated meanings. The preferred low molecular weight polymers are those wherein R' is a moiety of ethylene, propylene or of ethylene or propylene and a second ethylenically unsaturated hydrocarbon. Particularly preferred polymers of the above formulas I or II are those copolymers of carbon monoxide wherein each R' is a moiety of ethylene or propylene, especially propylene.

The low molecular weight polymers are produced by processes generally illustrated by the above European Patent Applications. The carbon monoxide and hydrocarbon monomers are contacted under polymerization conditions in the presence of a reaction diluent and the catalyst composition. Alkanolic reaction diluents are preferred, especially methanol, and a useful catalyst composition is formed from palladium acetate, 1,3-bis(diphenylphosphino)propane and copper p-toluenesulfonate or trifluoroacetic acid. Typical polymerization conditions include a reaction temperature of from about 30° C. to about 100° C. and a reaction pressure of from about 5 bar to about 100 bar. Reactant and catalyst composition contact is maintained in a suitable reactor by conventional methods such as shaking or stirring and subsequent to polymerization the reaction is terminated as by cooling the reaction mixture and releasing the pressure. The low molecular weight polymer is, on occasion, insoluble in the product mixture and on other occasions is soluble, depending in part upon the particular reaction diluent employed and the molecular weight of the low molecular weight polymer. The product is recovered by well known techniques such as filtration, solvent removal and extraction.

To produce the resin compositions of the invention the low molecular weight polyketone polymer is reacted with a polyfunctional curing agent in order to form a three-dimensional, highly crosslinked polymeric network. Suitable curing agents include primary di- or polyamines or primary di- or polyphosphines or salts of such amines or phosphines or complexes of such amines or phosphines with alkali metal salts. The preferred curing agents, however, are aliphatic di- or polyamines of from 2 to 12 carbon atoms inclusive having from 2 to 6 amino groups inclusive, at least two of which are primary amino groups. Such amines are illustrated by polymethylenediamines such as trimethylenediamine, hexamethylenediamine, pentamethylenediamine and octamethylenediamine as well as by the polyethylenepolyamines of the m ethylene moieties and m+1 amino groups, e.g., diethylenetriamine, triethylenetetraamine and tetraethylenepentamine. The polyethylenepolyamines are a particularly preferred class of curing agents, especially diethylenetriamine.

The cured composition, where used as a coating, is conveniently prepared by providing a film of the low molecular weight polymer on an object to be coated, adding the curing agent and heating the resulting composition. The films are deposited by employing the polymer as such, when the polymer is liquid, or by employing a solution of the polymer in a suitable solvent such as tetrahydrofuran, methanol or m-cresol. The molar ratio of low molecular weight polyketone polymer to the curing agent is suitably from about 10:1 to about 1:10 but higher or lower ratios may also be used. The preferred molar ratios of polyketone polymer to curing agent are from about 5:1 to about 1:5. It is useful on occasion to provide to the mixture to be cured an accelerator in order to increase the rate of the curing process. Suitable as the accelerator are strong acids such as hydrochloric acid or p-toluenesulfonic acid. When employed, molar amounts of accelerator up to about 0.03 moles of accelerator per mole of low molecular weight polyketone polymer are suitable. Suitable curing temperatures are above about 150° C. and preferably from about 175° C. to about 250° C.

The resin compositions are used as coating for solid objects as in the embodiment above described, but the resins may alternatively be cast, extruded or processed by other methods conventional for the application of thermosetting resin compositions. The compositions are useful as such but may also include conventional additives such as antioxidants, stabilizers, plasticizers and colorants.

The invention is further illustrated by the following Comparative Example (not of the invention) and the Illustrative Embodiments which should not be regarded as limiting.

ILLUSTRATIVE EMBODIMENT I

A linear alternating copolymer of carbon monoxide and propylene was produced by charging to an autoclave of 1 liter capacity, equipped with a mechanical stirrer, 250 ml of methanol, 106 mg cupric p-toluenesulfonate, 120 mg of 1,3-bis(diphenylphosphino)propane and 54 mg palladium acetate. The autoclave was flushed with carbon monoxide and then pressurized with carbon monoxide to a pressure of 60 bar. After the addition of 100 g of propylene, as a liquid, the pressure was adjusted to 40 bar with release of carbon monoxide. While stirred, the contents of the autoclave were heated to 80° C. and maintained at that temperature for 20 hours while carbon monoxide was added to keep a pressure of 60 bar. The autoclave was then cooled and vented. A yield of 69% (115 g) of carbon monoxide/propylene polymer was recovered from the resulting product mixture. The recovered polymer was stabilized with 2,6-di-t-butylphenol and maintained under nitrogen.

Analysis of the product indicated that about 10% of the mixture contained only one carbonyl group per molecule. This low boiling fraction was removed by vacuum distillation at 85° C. and 0.1 mm. The remaining product fraction was analyzed by infrared and NMR spectroscopy which indicated the product had a general formula of $C_3H_7—(—CO—C_3H_7)_nCO—OCH_3$ wherein n has an average value of about 13. The low molecular weight polymer was a viscous liquid.

COMPARATIVE EXAMPLE

A black and brittle coating was prepared by depositing a thin film (approx. 50 μm) of the low molecular weight polymer of Illustrative Embodiment I on a phosphated steel strip and placing the strip for 40 minutes in an oven maintained at 160° C. After cooling the degree of cure was qualitatively assessed by rubbing with methyl ethyl ketone (MEK) and scratching with a $H_4$ pencil (ASTM D3363-74). The crosslinked oligomer withstood fewer than 10 MEK rubs and perfomed poorly in the scratch test.

ILLUSTRATIVE EMBODIMENT II

A hard, tough, outer coating was produced on a steel strip by a process similar to that of the Comparative Example except that 1.1 mole of diethylenetriamine per mole of polymer was used as a curing agent. At approximately 200° C. in a nitrogen atmosphere a 100 μm thick film was obtained that withstood more than 100 MEK rubs and was not visibly scratched by a $H_4$ pencil.

ILLUSTRATIVE EMBODIMENT III

A hard, tough, black coating was produced on a steel strip by a procedure similar to that of the Comparative Example except that 0.25 mole of diethylenetriamine per mole of polymer was used as a curing agent. At approximately 190° C. for 90 minutes in air a 50 μm thick film was obtained that withstood more than 100 MEK rubs and was not visibly scratched by a $H_4$ pencil.

What is claimed is:

1. A thermosetting resin composition comprising an oligomeric low molecular weight, linear alternating polymer of carbon monoxide and at least one ethylenically unsaturated hydrocarbon and a polyfunctional curing agent.

2. The composition of claim 1 wherein the polymer has a molecular weight from about 500 to about 1800.

3. The composition of claim 2 wherein the curing agent has from 2 to 12 carbon atoms inclusive and from 2 to 6 amino groups inclusive, at least two of which are primary.

4. The composition of claim 3 wherein the polymer is of the formula

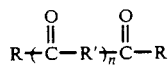

wherein R independently is alkyl of from 2 to 8 carbon atoms inclusive or alkoxy of up to 8 carbon atoms inclusive, R' independently is alkylene of up to 8 carbon atoms inclusive and n is an average number reflecting the molecular weight of the polymer.

5. The composition of claim 4 wherein the curing agent is a polyethylenepolyamine of m ethylene moieties and m+1 amino groups.

6. The composition of claim 3 wherein the polymeric chain of the polymer is represented by the formula

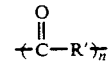

wherein n is an average number reflecting the molecular weight of the polymer and R' independently is alkylene of up to 8 carbon atoms inclusive.

7. The composition of claim 6 wherein the curing agent is a polyethylenepolyamine of m ethylene moieties and m+1 amino groups.

8. The composition of claim 7 wherein R' is propylene.

9. The composition of claim 8 wherein the curing agent is diethylenetriamine.

10. The cured composition produced by heating the composition of claim 1 to a temperature above about 150° C.

11. The cured composition produced by heating the composition of claim 9 to a temperature of above about 150° C.

12. A coated solid object wherein the coating is the cured composition of claim 10.

13. A coated metal object wherein the coating is the cured composition of claim 11.

* * * * *